US012725563B2

(12) United States Patent
Yang et al.

(10) Patent No.: US 12,725,563 B2
(45) Date of Patent: Sep. 1, 2026

(54) DISPLAY PANEL AND DISPLAY DEVICE

(71) Applicant: XIAMEN TIANMA DISPLAY TECHNOLOGY CO., LTD., Xiamen (CN)

(72) Inventors: Di Yang, Xiamen (CN); Ying Sun, Xiamen (CN)

(73) Assignee: XIAMEN TIANMA DISPLAY TECHNOLOGY CO., LTD., Xiamen (CN)

( * ) Notice: Subject to any disclaimer, the term of this patent is extended or adjusted under 35 U.S.C. 154(b) by 0 days.

(21) Appl. No.: 18/757,540

(22) Filed: Jun. 28, 2024

(65) Prior Publication Data

US 2024/0346996 A1 Oct. 17, 2024

(30) Foreign Application Priority Data

Aug. 8, 2023 (CN) ......................... 202310993447.2

(51) Int. Cl.
*G09G 3/32* (2016.01)
*G09G 3/20* (2006.01)
*G09G 3/3208* (2016.01)
*G09G 3/3233* (2016.01)

(52) U.S. Cl.
CPC ............. *G09G 3/32* (2013.01); *G09G 3/2074* (2013.01); *G09G 3/3208* (2013.01); *G09G 3/3233* (2013.01); *G09G 2320/0247* (2013.01); *G09G 2330/021* (2013.01)

(58) Field of Classification Search
CPC ...... G09G 3/2074; G09G 3/32; G09G 3/3208; G09G 3/3233; G09G 2320/0247; G09G 2330/021; G09G 5/393
USPC ...................................................... 345/55, 56
See application file for complete search history.

(56) References Cited

U.S. PATENT DOCUMENTS

| | | | | |
|---|---|---|---|---|
| 2016/0042708 A1* | 2/2016 | Wang | G09G 3/3611 345/214 |
| 2019/0043435 A1* | 2/2019 | Yang | G09G 3/3406 |
| 2021/0035488 A1* | 2/2021 | Seo | G09G 3/325 |
| 2021/0110771 A1* | 4/2021 | Lee | G09G 3/3258 |
| 2022/0309977 A1* | 9/2022 | Lu | G09G 3/20 |
| 2025/0098452 A1* | 3/2025 | Yu | H10K 59/1201 |

* cited by examiner

*Primary Examiner* — Jason M Mandeville
(74) *Attorney, Agent, or Firm* — KILPATRICK TOWNSEND & STOCKTON LLP

(57) ABSTRACT

A display panel and a display device are provided. The display panel includes a first display area, a second display area and a pixel circuit. The pixel circuit includes a first pixel circuit and a second pixel circuit. The first pixel circuit is connected to a light emitting element in the first display area. The second pixel circuit is connected to a light emitting element in the second display area. The pixel circuit operates in a first mode and a second mode. In the first mode, the first display area corresponds to a refresh rate of F11, and the second display area corresponds to a refresh rate of F12. In the second mode, the first display area corresponds to a refresh rate of F21, and the second display area corresponds to a refresh rate of F22. There is a relationship of $|F21-F11| \neq |F22-F12|$.

11 Claims, 21 Drawing Sheets

$|F21-F11| \neq |F22-F12|$,
$|F21-F11| \neq |F23-F13|$; and/or $|F22-F12| \neq |F22-F13$,
$F11>F12>F13$, $F11/F12 \leq F12/F13$, $F21>F22>F23$, $F21/F22 \leq F22/F23$,
$F11>F21$ and $1 \leqslant F11/F12<F21/F22$, or $(F21-F11)\times(F22-F12)<0$ $|F21-F11| \neq |F22-F12|$, $|F21-F11| \neq |F23-F13|$; and/or $|F22-F12| \neq |F22-F13$, $F12>F11$, and $F12>F13$; and/or $F22>F21$, and $F23>F13$;

$|F12-F11|>|F12-F13|$, $|F22-F21|<|F22-F23|$; or $|F12-F11|<|F12-F13|$, $|F22-F21|>|F22-F23|$ $|F21-F11| \neq |F22-F12|$, $|F21-F11| \neq |F23-F13|$; and/or $|F22-F12| \neq |F22-F13$, $F11>F12>F13$, $F11/F12 \leq F12/F13$, $F21>F22>F23$, $F21/F22 \leq F22/F23$, $F11>F21$ and $1 \leqslant F11/F12<F21/F22$;

$F12=F22$ and $F11 \neq F21$ $|F21-F11| \neq |F22-F12|$,
$|F21-F11| \neq |F23-F13|$; and/or
$|F22-F12| \neq |F22-F13$,
$F11>F12>F13$, $F11/F12 \leq F12/F13$, $F21>F22>F23$, $F21/F22 \leq F22/F23$,
$(F21-F11) \times (F22-F12)<0$,
$F21-F11>0$ and $F22-F12<0$; or $F21-F11<0$ and $F22-F12>0$

DISPLAY PANEL AND DISPLAY DEVICE

This application claims priority to Chinese Patent Application No. 202310993447.2, titled "DISPLAY PANEL AND DISPLAY DEVICE", filed on Aug. 8, 2023 with the China National Intellectual Property Administration, which is hereby incorporated by reference in its entirety.

FIELD

The present disclosure relates to the field of display technologies, and in particular to a display panel and a display device.

BACKGROUND

With ongoing development of display technologies and increasing consumer demand, display panels perform increasingly diverse functions. In some scenarios, one display panel is to perform various display functions. For example, the display panel performs differently in order to display a game, a movie, text and time information.

The display panel is generally divided into areas for various functions and effects. Therefore, how to provide a display panel capable of performing diverse functions separately is a problem to be solved urgently.

SUMMARY

A display panel and a display device are provided according to embodiments of the present disclosure. Different display areas correspond to separate refresh rates, for these display areas to perform their respective functions better.

In one embodiment, a display panel is provided the present disclosure. The display panel includes a first display area, a second display area and a pixel circuit. The pixel circuit includes a first pixel circuit and a second pixel circuit. The first pixel circuit is connected to a light emitting element in the first display area. The second pixel circuit is connected to a light emitting element in the second display area. The pixel circuit is configured to operate in a first mode and a second mode. In the first mode, the first display area corresponds to a refresh rate of F11, and the second display area corresponds to a refresh rate of F12. In the second mode, the first display area corresponds to a refresh rate of F21, and the second display area corresponds to a refresh rate of F22. There is a relationship of $|F21-F11|\neq|F22-F12|$.

Based on the embodiments, a display device is provided in some embodiments. The display device includes the display panel as described in the embodiments.

The display panel and the display device according to embodiments of the present disclosure are described above. The display panel includes the first display area and the second display area that are different. In the same mode, the first display area corresponds to a refresh rate different than the second display area. The first display area in one mode corresponds to a refresh rate different than the second display area in the other mode. In the embodiments of the present disclosure, there is the relationship of $|F21-F11|\neq|F22-F12|$, that is, the refresh rate corresponding to the first display area changes differently than the second display area, and the refresh rate corresponding to the first display area can be modified separately from the refresh rate corresponding to the second display area in each mode. Therefore, the display areas can perform their respective functions better.

BRIEF DESCRIPTION OF THE DRAWINGS

Other embodiments of the present disclosure can become more apparent by reading the following detailed description of non-limiting embodiments with reference to the accompanying drawings. The same or similar reference numerals represent the same or similar features throughout the drawings, and the drawings are not drawn to actual scale.

DETAILED DESCRIPTION

The features and embodiments of various embodiments of the present disclosure are described in detail below. In order to clearly explain the purpose, the embodiments of the present disclosure, the present disclosure is further described in detail below in conjunction with the accompanying drawings and specific embodiments. It should be understood that the embodiments described herein are for explaining the present disclosure instead of limiting the present disclosure. The following description of embodiments is merely intended to provide a better understanding of the present disclosure by examples.

It should be noted that relational terms such as first and second herein are only used to distinguish one entity or operation from another instead of necessitating or implying a relationship or sequence between entities or operations. Furthermore, the terms "comprise", "include" or any other variations thereof are intended to cover a non-exclusive inclusion, and a process, method, article, or device including a list of elements includes not only those elements but also other elements not expressly listed, or also includes elements inherent in the process, method, article, or device. Without further limitations, an element defined by the statement "comprising . . . " does not exclude the presence of additional same elements in the process, method, article or device.

It should be understood that the term "and/or" used herein is only for describing three alternatives. For example, A and/or B indicates a case that A exists alone, a case that A and B exist simultaneously, or a case that B exists alone.

It should be noted that an element expressed as being "connected" or "electrically connected" to another element may be directly or indirectly connected to the other element.

Various modifications and changes can be made to the present disclosure without departing from the embodiments of the present disclosure. Therefore, the present disclosure intends to cover the modifications and changes falling within the scope of the claims (embodiments to be protected) and their equivalents. It should be noted that the embodiments of the present disclosure may be combined with each other if there is no contradiction.

A display panel and a display device are provided according to embodiments of the present disclosure. The display panel and the display device are described below in embodiments with reference to the drawings.

A display panel is provided according to the embodiments of the present disclosure. The display panel is an organic light emitting diode (OLED) display panel, a micro light emitting diode (micro-LED) display panel or the like, which is not limited herein.

Figure 1:
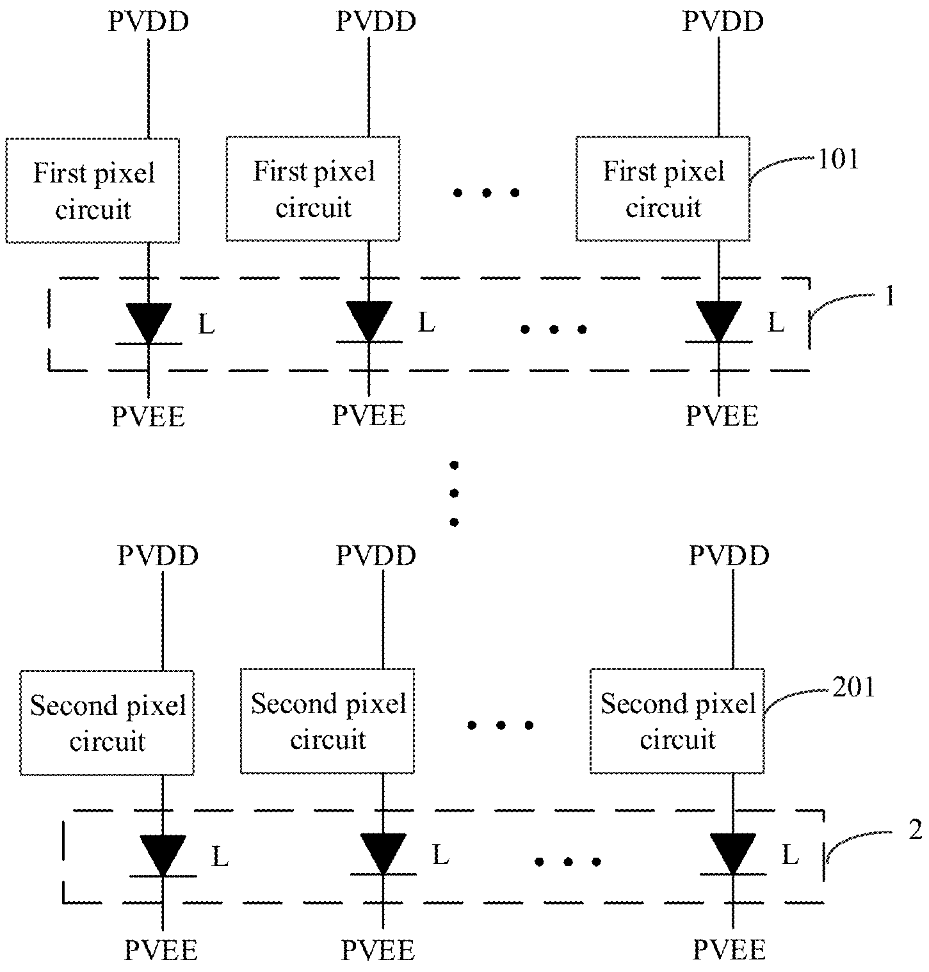
FIG. 1 is a schematic diagram illustrating a display panel according to an embodiment of the present disclosure.

FIG. 1 is a schematic structural diagram illustrating a display panel according to an embodiment of the present disclosure. The display panel includes a first display area 1, a second display area 2 and a pixel circuit.

The pixel circuit includes a first pixel circuit 101 and a second pixel circuit 201. The first pixel circuit 101 supplies a current for driving a light emitting element L in the first display area 1. The second pixel circuit 201 supplies a current for driving a light emitting element L in the second display area 2.

Figure 2:
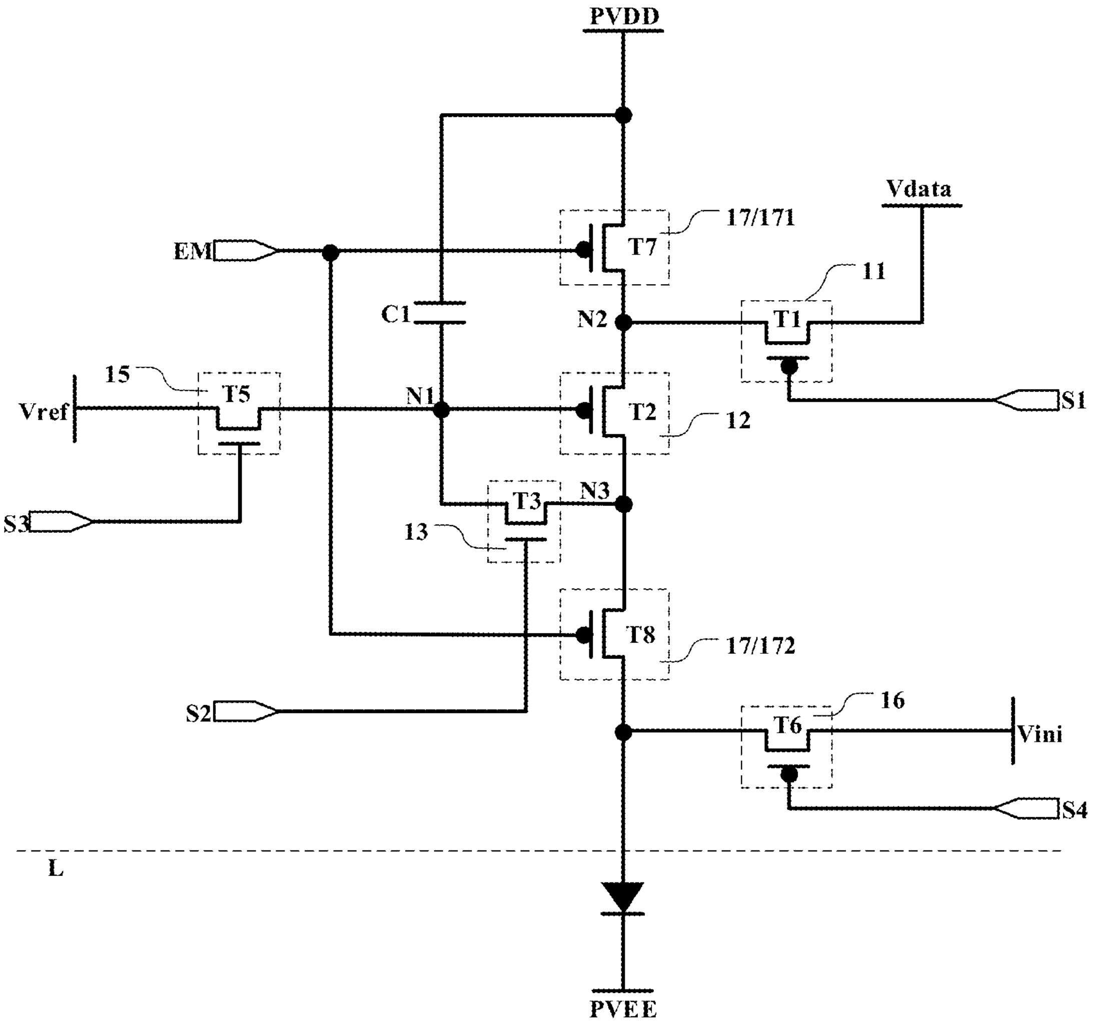
FIG. 2 is a schematic diagram illustrating a pixel circuit according to an embodiment of the present disclosure.
Figure 3:
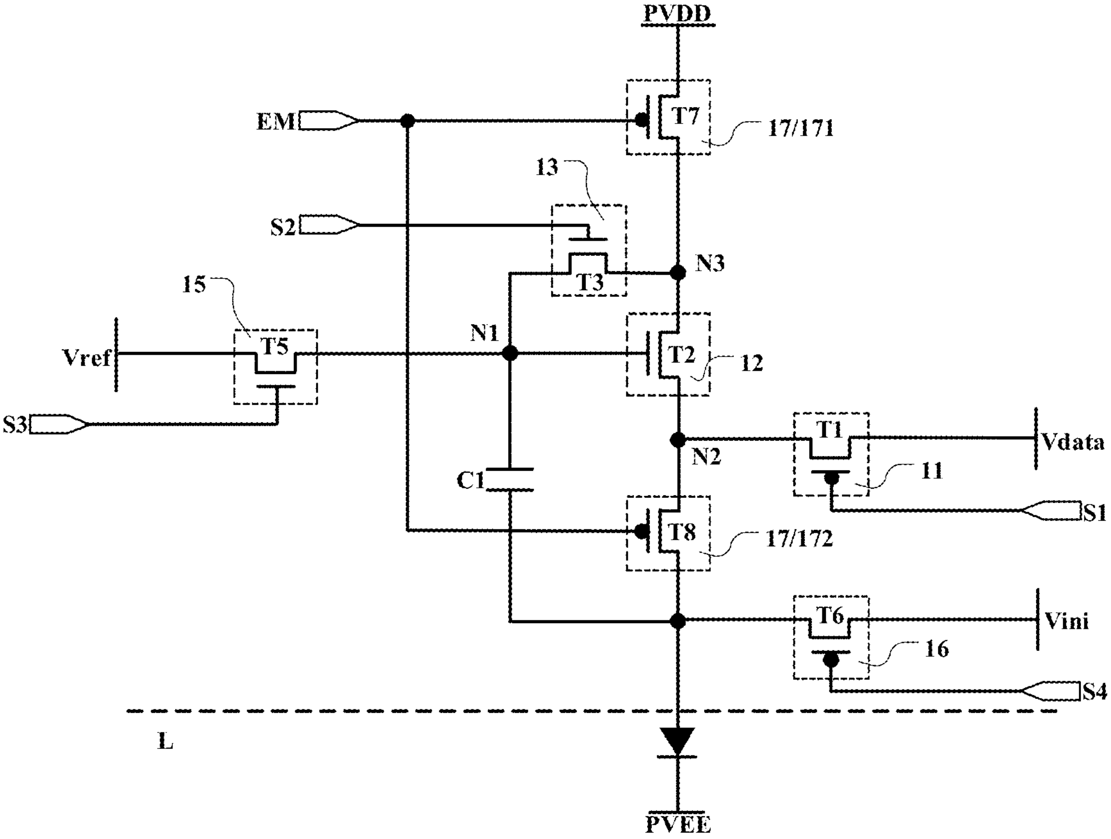
FIG. 3 is a schematic diagram illustrating the pixel circuit according to another embodiment of the present disclosure.
Figure 4:
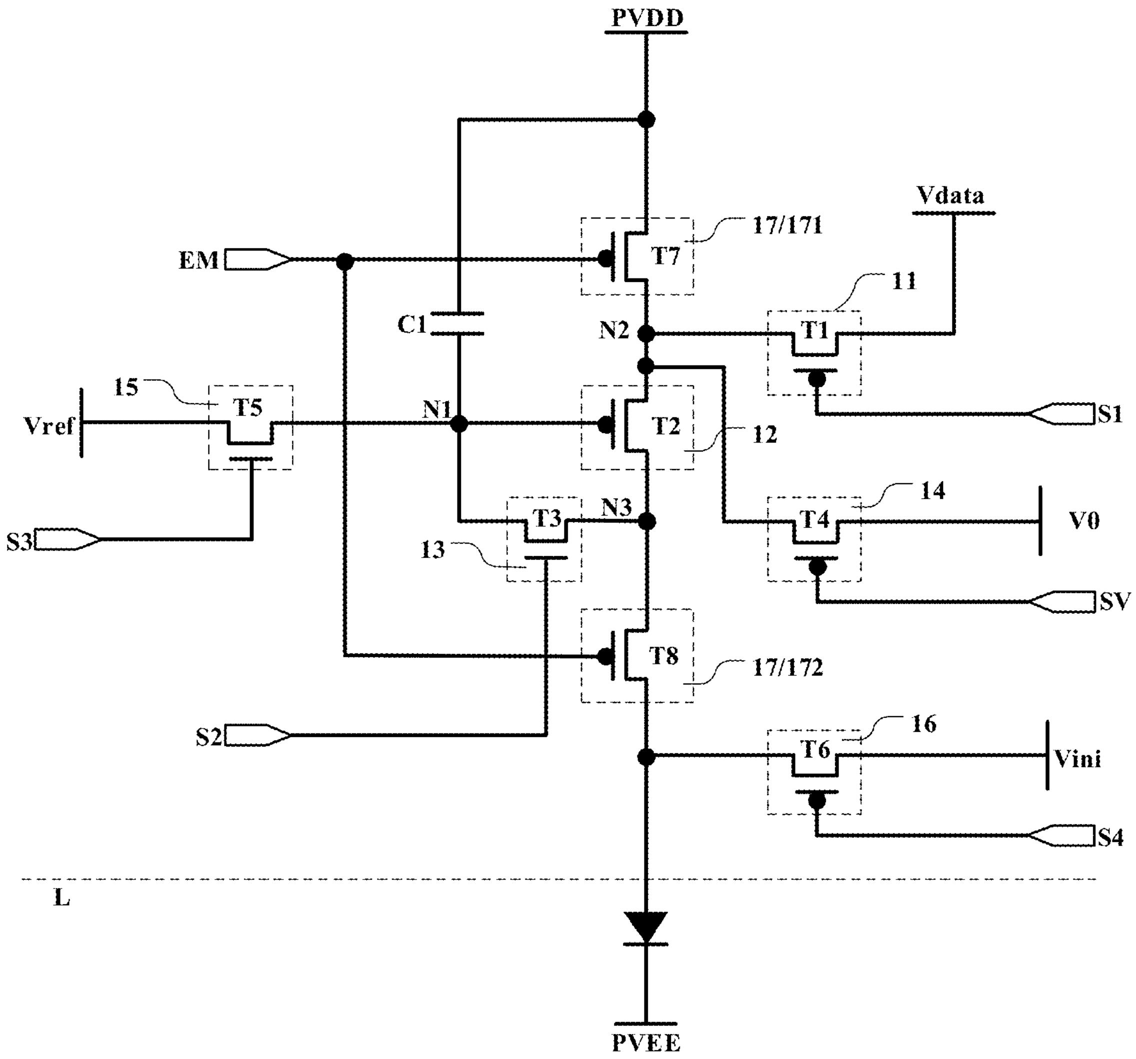
FIG. 4 is a schematic diagram illustrating the pixel circuit according to another embodiment of the present disclosure.
Figure 5:
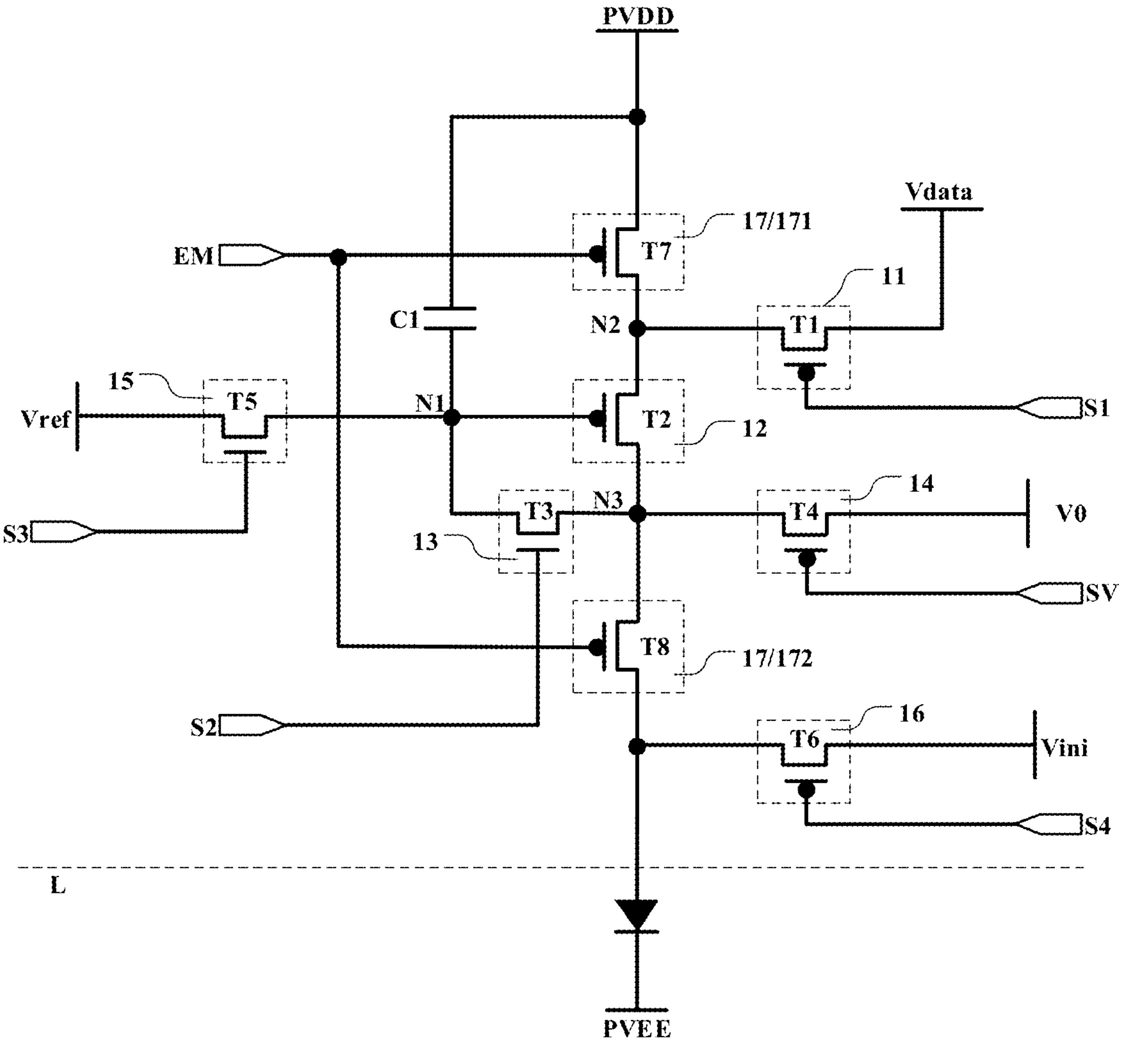
FIG. 5 is a schematic diagram illustrating the pixel circuit according to another embodiment of the present disclosure.
Figure 6:
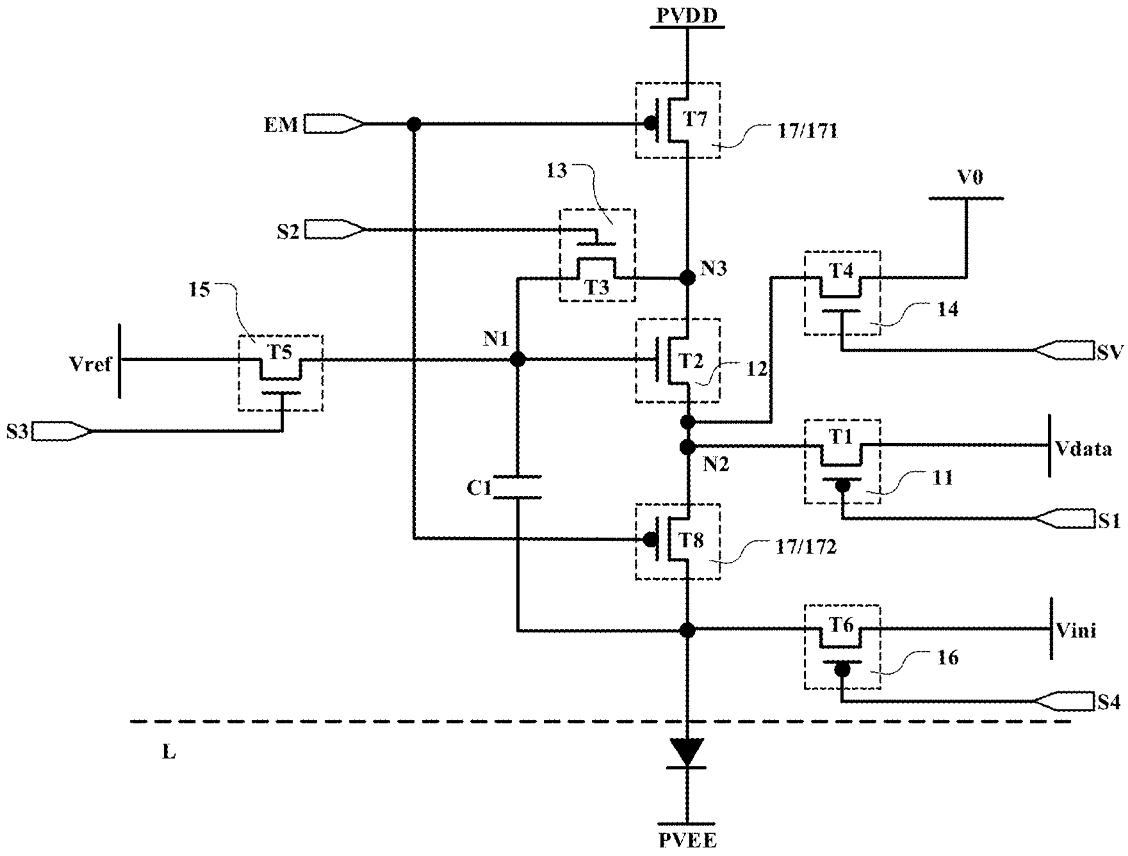
FIG. 6 is a schematic diagram illustrating the pixel circuit according to another embodiment of the present disclosure.
Figure 7:
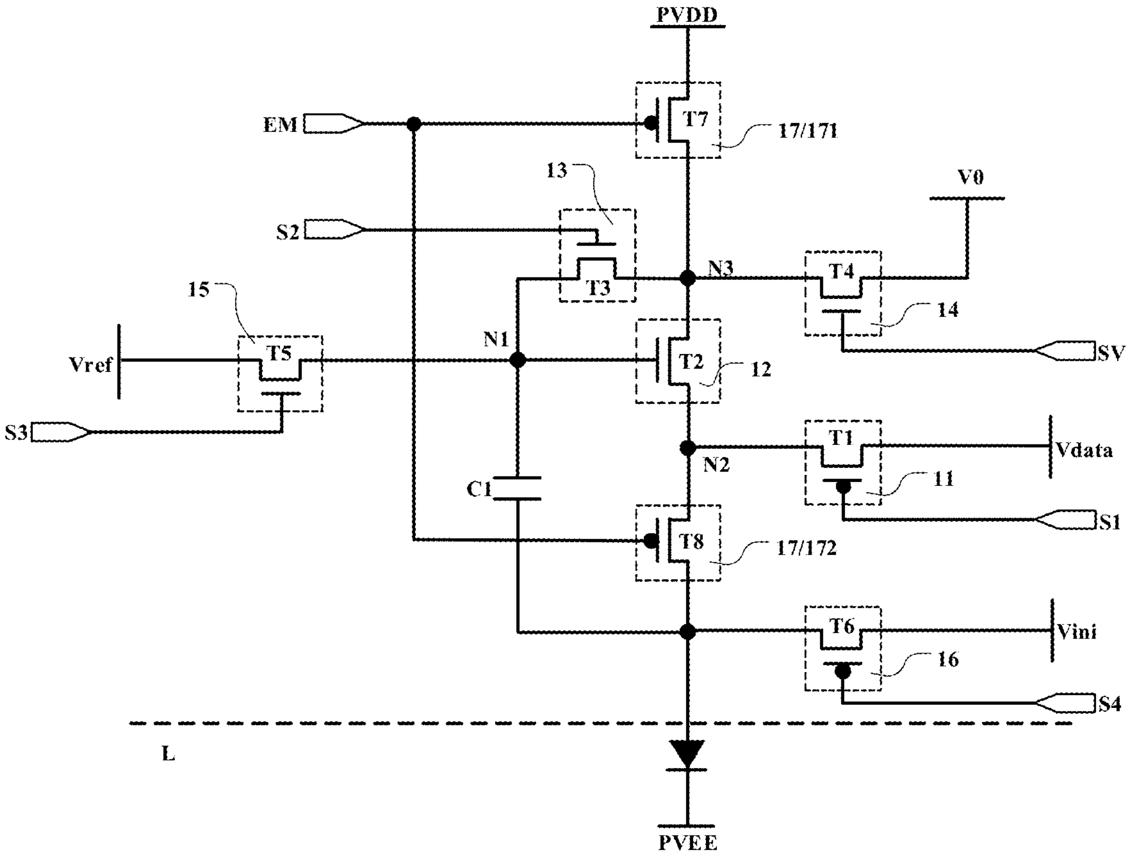
FIG. 7 is a schematic diagram illustrating the pixel circuit according to another embodiment of the present disclosure.

In one embodiment, reference is made to FIGS. 2 to 7. FIG. 2 is a schematic diagram illustrating the pixel circuit according to an embodiment of the present disclosure. FIG. 3 is a schematic diagram illustrating the pixel circuit according to another embodiment of the present disclosure. FIG. 4 is a schematic diagram illustrating the pixel circuit according to another embodiment of the present disclosure. FIG. 5 is a schematic diagram illustrating the pixel circuit according to another embodiment of the present disclosure. FIG. 6 is a schematic diagram illustrating the pixel circuit according to another embodiment of the present disclosure. FIG. 7 is a schematic diagram illustrating the pixel circuit according to another embodiment of the present disclosure. The pixel circuit according to the embodiments of the present disclosure includes a data writing module 11, a driving module 12, and a compensation module 13. The driving module 12 includes a driving transistor T2. The driving transistor T2 is configured to supply a current for driving the light emitting element L of the display panel 100. The data writing module 11 is connected to a first electrode of the driving transistor T2 (i.e., N2 node), and is configured to provide a data signal Vdata for the driving transistor T2. The compensation module 13 is connected between a gate electrode (i.e., N1 node) and a second electrode (i.e., N3 node) of the driving transistor, and is configured to compensate for a threshold voltage of the driving transistor T2.

In addition, the pixel circuit includes a reset module 15, an initialization module 16 and a light emitting control module 17. The reset module 15 is configured to provide a reset signal Vref to the gate electrode of the driving transistor T2. The initialization module 16 is configured to provide an initialization signal Vini to the light emitting element L. The light emitting control module 17 is configured to selectively control the light emitting element L to emit light. In one embodiment, the light emitting control module 17 includes a first light emitting control module 171 and a second light emitting control module 172. The first light emitting control module 171 is connected between a first power signal terminal PVDD and the first electrode of the driving transistor T2. The second light emitting control module 172 is connected between the second electrode of the driving transistor T2 and the light emitting element L.

In some embodiments, a control terminal of the data writing module 11 receives a first scanning signal S1. The first scanning signal S1 is for switching on or off the data writing module 11. A control terminal of the compensation module 13 receives a second scanning signal S2. The second scanning signal S2 is for switching on or off the compensation module 13. A control terminal of the reset module 15 receives a third scanning signal S3. The third scanning signal S3 is for switching on or off the reset module 15. A control terminal of the initialization module 16 receives a fourth scanning signal S4. The fourth scanning signal S4 is for switching on or off the initialization module 16. A control terminal of the light emitting control module 17 receives a light emitting control signal EM. The light emitting control signal EM is for switching on or off the light emitting control module 17.

In addition, in some embodiments, the data writing module 11 includes a data writing transistor T1, which is switched on or off in response to the first scanning signal S1. The compensation module 13 includes a compensation transistor T3, which is switched on or off in response to the second scanning signal S2. The reset module 15 includes a reset transistor T5, which is switched on or off in response to the third scanning signal S3. The initialization module 16 includes an initialization transistor T6, which is switched on or off in response to the fourth scanning signal S4. The first light emitting control module 171 includes a first light emitting control transistor T7, which is switched on or off in response to the light emitting control signal EM. The second light emitting control module 172 includes a second light emitting control transistor T8, which is switched on or off in response to the light emitting control signal EM.

It should be noted that, as shown in FIGS. 4 to 7, the pixel circuit further includes a bias modification module 14 for providing a bias modification signal to the driving transistor T2. In one embodiment, as shown in FIG. 4 and FIG. 6, the bias modification module 14 is connected to the first electrode of the driving transistor T2 (that is, node N2). As shown in FIG. 5 and FIG. 7, the bias modification module 14 is connected to the second electrode of the driving transistor T2 (that is, N3 node). In one embodiment, a control terminal of the bias modification module 14 receives a bias modification control signal SV, and is switched on or off in response to the bias modification control signal SV. The bias modification module 14 includes a bias modification transistor T4, which is switched on or off in response to the bias modification control signal SV.

In addition, as shown in FIG. 2, FIG. 4, and FIG. 5, the driving transistor T2 in the pixel circuit is a PMOS transistor. The pixel circuit further includes a storage capacitor C1. A first electrode of the storage capacitor C1 is connected to the first power signal terminal. A second electrode of the storage capacitor C1 is connected to the gate electrode of the driving transistor T2. The storage capacitor C1 is configured to store the signal transmitted to the gate electrode of the driving transistor T2. As shown in FIG. 3, FIG. 6, and FIG. 7, the driving transistor T2 in the pixel circuit is an NMOS transistor. The pixel circuit further includes a storage capacitor C1. A first electrode of the storage capacitor C1 is connected to the light emitting element L. A second electrode of the storage capacitor C1 is connected to the gate electrode of the driving transistor T2. The storage capacitor C1 is configured to store the signal transmitted to the gate electrode of the driving transistor T2.

In addition, a second electrode of the light emitting element is connected to a second power signal terminal PVEE. The driving current is generated due to a potential difference between the power signal terminals PVDD and PVEE, to drive the light emitting element to emit light. In the embodiments of the present disclosure, a positive power signal is expressed as a PVDD signal, and a negative power signal is expressed as a PVEE signal.

In addition, FIG. 2 to FIG. 7 only illustrate some rather than all examples of the pixel circuit. Other pixel circuits with refresh rates matching the definition in the present disclosure should all fall within the protection scope of the present disclosure.

In some embodiments, the pixel circuit is configured to operate in a first mode and a second mode.

In the first mode, the first display area 1 corresponds to a refresh rate of F11, and the second display area 2 corresponds to a refresh rate of F12. In the second mode, the first display area 1 corresponds to a refresh rate of F21, and the second display area 2 corresponds to a refresh rate of F22. There is a relationship of $|F21-F11| \neq |F22-F12|$.

The refresh rate refers to a frequency with which the data signal Vdata is written to the gate electrode of the driving transistor T2 in the pixel circuit. A high refresh rate indicates that a potential at the gate electrode of the driving transistor T2 changes frequently. Conversely, a low refresh rate indicates that the potential at the gate electrode of the driving transistor T2 changes infrequently.

The display panel includes the first display area and the second display area that are different. In the same mode, the first display area corresponding to a refresh rate different than the second display area. The first display area in one mode corresponds to a refresh rate different from the second display area in the other mode. In the embodiments of the present disclosure, there is the relationship of $|F21-F11| \neq |F22-F12|$, that is, the refresh rate corresponding to the first display area changes differently than the second display area, and the refresh rate corresponding to the first display area can be modified separately from the refresh rate corresponding to the second display area in each mode. Therefore, the display areas can perform their respective functions better.

It should be understood that the refresh rate corresponding to the first display area and the refresh rate corresponding to the second display area may have the relationship of $|F21-F11| \neq |F22-F12|$, $|F21-F11| > |F22-F12|$, or $|F21-F11| < |F22-F12|$.

$|F21-F11| > |F22-F12|$ indicates that a difference in the refresh rate corresponding to the first display area between the first mode and the second mode is greater than a difference in the refresh rate corresponding to the second display area between the first mode and the second mode. $|F21-F11| < |F22-F12|$ indicates that the difference in the refresh rate corresponding to the first display area between the first mode and the second mode is less than the difference in the refresh rate corresponding to the second display area between the first mode and the second mode.

For example, $|F21-F11| \neq |F22-F12|$ corresponds to the following scenarios.

In a first scenario, the first display area corresponding to the same refresh rate as the second display area in one of the first mode and the second mode. In the other mode, the first display area corresponds to a refresh rate different than the second display area. For example, in the first mode, the first display area and the second display area both correspond to a refresh rate of 120 HZ. In the second mode, the first display area corresponds to a refresh rate increased or decreased differently than the second display area. For example, in the first mode, the first display area and the second display area correspond to a refresh rate of 60 HZ. In the second mode, one of the first display area and the second display area corresponds to an increased refresh rate, while the other display area corresponds to a decreased refresh rate. For example, in the first mode, the first display area and the second display area correspond to a refresh rate of 60 HZ. In the second mode, one of the first display area and the second display area corresponds to an unchanged refresh rate, while the other display area corresponds to an increased or decreased refresh rate.

In a second scenario, in each of the first mode and the second mode, the first display area corresponds to a refresh rate different than the second display area. For example, the first display area corresponds to a refresh rate of 120 HZ while the second display area corresponds to a refresh rate of 60 HZ in the first mode. In the second mode, the data is at least one of the first display area and the second display area corresponds to an increased or decreased refresh rate.

Only some instead of all of the application scenarios are described above. Other application scenarios with refresh rates corresponding to the first and second display area matching the definition in the present disclosure should all fall within the protection scope of the present disclosure.

The refresh rates corresponding to the first and second display areas are described in further detail below.

In some embodiments, the refresh rate corresponding to the first display area and the refresh rate corresponding to the second display area have the relationship of $(F21-F11) \times (F22-F12) \geq 0$.

In a case of $(F21-F11) \times (F22-F12) = 0$, at least one of the refresh rate corresponding to the first display area and the refresh rate corresponding to the second display area remains unchanged. For example, in the case of $F21=F11$, the first display area corresponds to the same refresh rate in the first mode and the second mode. In one embodiment, in the case of $F22=F12$, the second display area corresponds to the same refresh rate in the first mode and the second mode.

In a case of $(F21-F11) \times (F22-F12) > 0$, the refresh rate corresponding to the first display area and the refresh rate corresponding to the second display area change in the same way. For example, in response to the switch from the first mode to the second mode, the refresh rate corresponding to the first display area and the refresh rate corresponding to the second display area are both increased or decreased.

In some embodiments, the refresh rate corresponding to the first display area and the refresh rate corresponding to the second display area have the relationship of $F11=F21$ and $F21 \neq F22$, or the relationship of $F12=F22$ and $F11 \neq F21$.

In a case of $F11=F21$ and $F21 \neq F22$, the first display area corresponds to the same refresh rate in the first mode and the second mode, while the second display area corresponds to different refresh rates in the first mode and the second mode. For example, the first display area corresponds to a refresh rate of 120 HZ in both the first mode and the second mode, while the second display area corresponds to a refresh rate of 120 HZ in the first mode, and 60 HZ or 144 HZ in the second mode.

Figure 25:
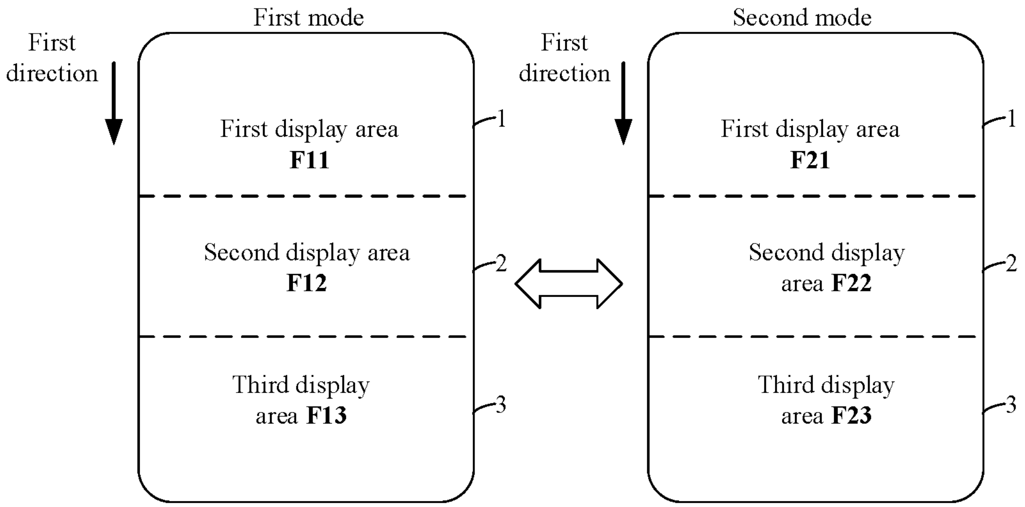

In a case of $F12=F22$ and $F11 \neq F21$, as shown in FIG. 25, the second display area corresponds to the same refresh rate in the first mode and the second mode, while the first display area corresponds to a refresh rate different than the second mode in the first mode. For example, the second display area corresponds to a refresh rate of 120 HZ in both the first mode and the second mode, while the first display area corresponds to a refresh rate of 120 HZ in the first mode, and 60 HZ or 144 HZ in the second mode.

In some embodiments, the refresh rate corresponding to the first display area and the refresh rate corresponding to the second display area have the relationship of $F21-F11>0$ and $F22-F12>0$, or the relationship of $F21-F11<0$ and $F22-F12<0$.

In a case of $F21-F11>0$ and $F22-F12>0$, in response to the switch from the first mode to the second mode, the refresh rate corresponding to the first display area and the refresh rate corresponding to the second display area are both increased. For example, in the first mode, the first display area corresponds to a refresh rate of 60 HZ and the second display area corresponds to a refresh rate of 90 HZ. In the second mode, the first display area corresponds to a refresh rate of 120 HZ, and the second display area corresponds to a refresh rate of 144 HZ.

In a case of $F21-F11<0$ and $F22-F12<0$, in response to the switch from the first mode to the second mode, the refresh rate corresponding to the first display area and the refresh rate corresponding to the second display area are both decreased. For example, in the first mode, the first display area corresponds to a refresh rate of 60 HZ, and the second display area corresponds to a refresh rate of 90 HZ. In the second mode, the first display area corresponds to a refresh rate of 30 HZ, and the second display area corresponds to a refresh rate of 45 HZ.

Figure 23:
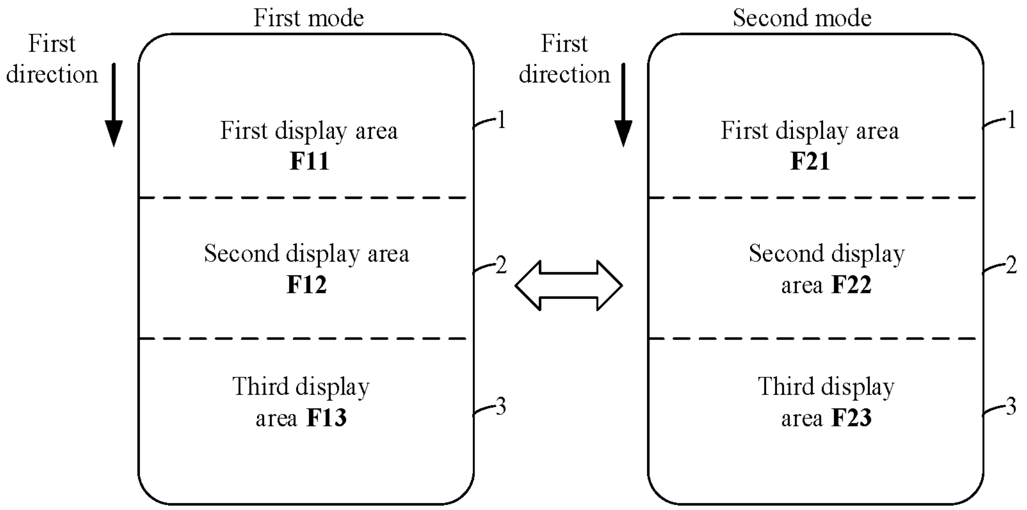

In other embodiments, the refresh rate corresponding to the first display area and the refresh rate corresponding to the second display area have the relationship of $(F21-F11)\times(F22-F12)<0$, as shown in FIG. 23. The refresh rate corresponding to the first display area and the refresh rate corresponding to the second display area change differently. For example, in response to the switch from the first mode to the second mode, the refresh rate corresponding to one of the first and second display areas is increased and while the refresh rate corresponding to the other display area is decreased.

Figure 26:
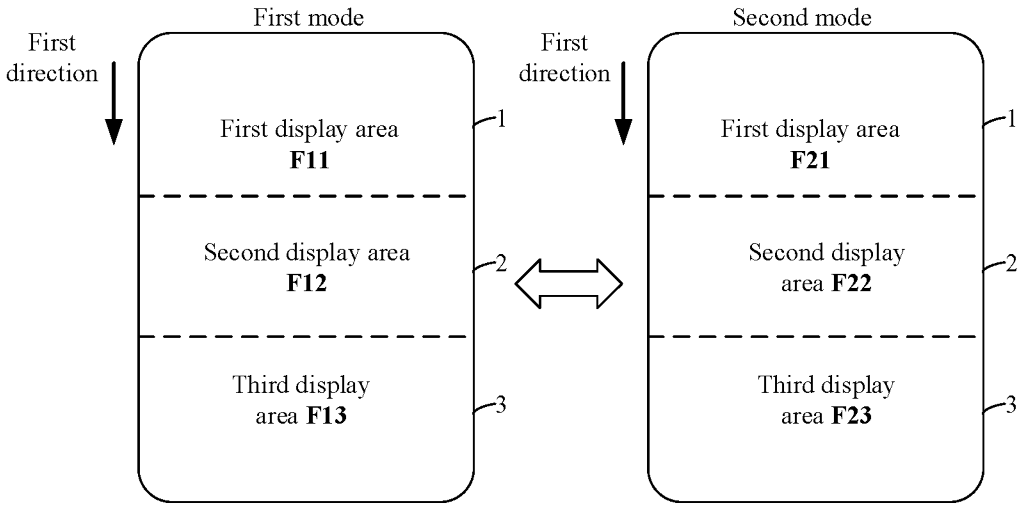

In some embodiments, the refresh rate corresponding to the first display area and the refresh rate corresponding to the second display area have the relationship of $F21-F11>0$ and $F22-F12<0$, or the relationship of $F21-F11<0$ and $F22-F12>0$, as shown in FIG. 26.

In a case of $F21-F11>0$ and $F22-F12<0$, in response to the switch from the first mode to the second mode, the refresh rate corresponding to the first display area is increased while the refresh rate corresponding to the second display area is decreased. For example, in the first mode, the first display area corresponds to a refresh rate of 10 HZ and the second display area corresponds to a refresh rate of 10 HZ. In the second mode, the first display area corresponds to a refresh rate of 120 HZ, and the second display area corresponds to a refresh rate of 1 HZ.

In a case of $F21-F11<0$ and $F22-F12>0$, in response to the switch from the first mode to the second mode, the refresh rate corresponding to the first display area is decreased while the refresh rate corresponding to the second display area is increased. For example, in the first mode, the first display area corresponds to a refresh rate of 120 HZ and the second display area corresponds to a refresh rate of 120 HZ. In the second mode, the first display area corresponds to a refresh rate of 60 HZ, and the second display area corresponds to a refresh rate of 144 HZ.

In some embodiments, the refresh rate corresponding to the first display area and the refresh rate corresponding to the second display area have the relationship of $|F11-F12|\neq|F21-F22|$. $|F11-F12|$ is a difference between the refresh rate corresponding to the first display area and the refresh rate corresponding to the second first display area in the first mode. $|F21-F22|$ is a difference between the refresh rate corresponding to the first display area and the refresh rate corresponding to the second first display area in the second mode. The difference in the first mode can be modified separately from the difference in the second mode, and the display areas can better perform their respective functions.

In some embodiments, the refresh rate corresponding to the first display area and the refresh rate corresponding to the second display area have the relationship of $F11<F21$ and $|F11-F12|<|F21-F22|$, or relationship of the $F11>F21$, $|F11-F12|>|F21-F22|$.

In a case of $F11<F21$, in response to the switch from the first mode to the second mode, the refresh rate corresponding to the first display area is increased. A high refresh rate in a mode indicates the significant difference in refresh rate between the first display area and the second display area in this mode.

In a case of $F11>F21$, in response to the switch from the first mode to the second mode, the refresh rate corresponding to the first display area is decreased. A low refresh rate in a mode indicates the slight difference in refresh rate between the first display area and the second display area in this mode.

For example, in the first mode, the first display area corresponds to a refresh rate of 10 HZ, the second display area corresponds to a refresh rate of 1 HZ, and $|F11-F12|=9$ HZ. In the second mode, the first display area corresponds to a refresh rate of 60 HZ, the second display area corresponds to a refresh rate of 30 HZ, and $|F21-F22|=30$ HZ. In the second mode, the first and second display areas correspond to a high refresh rate. In response to the switch from the first mode to the second mode, the difference in refresh rate between the two display areas is increased.

For example, in the first mode, the first display area corresponds to a refresh rate of 60 HZ, the second display area corresponds to a refresh rate of 3 HZ, and $|F11-F12|=30$ HZ. In the second mode, the first display area corresponds to a refresh rate of 10 HZ, the second display area corresponds to a refresh rate of 1 HZ, and $|F21-F22|=9$ HZ. In the first mode, the first and second display areas corresponds to a high refresh rate. In response to the switch from the first mode to the second mode, the difference in refresh rate between the two display areas is decreased.

In some embodiments, the refresh rate corresponding to the first display area and the refresh rate corresponding to the second display area have the relationship of $F11<F21$ and $F11/F12>F21/F22\geq1$, or the relationship of $F11>F21$ and $1\leq F11/F12<F21/F22$, as is shown in FIG. 23.

In a case of $F11<F21$, in response to the switch from the first mode to the second mode, the refresh rate corresponding to the first display area is increased. A high refresh rate in a mode indicates a small ratio of the refresh rate corresponding to the first display area to the refresh rate corresponding to the second display area in this mode.

In a case of $F11>F21$, in response to the switch from the first mode to the second mode, the refresh rate corresponding to the first display area is decreased. A low refresh rate in a mode indicates a large ratio of the refresh rate corresponding to the first display area to the refresh rate corresponding to the second display area in this mode.

For example, in the first mode, the first display area corresponds to a refresh rate of 10 HZ, the second display area corresponds to a refresh rate of 1 HZ, and $F11/F12=10$.

In the second mode, the first display area corresponds to a refresh rate of 60 HZ, the second display area corresponds to a refresh rate of 30 HZ, and F21/F22-2. In the second mode, the first and second display areas corresponds to a high refresh rate. In response to the switch from the first mode to the second mode, the ratio of the refresh rate corresponding to the first display area to the refresh rate corresponding to the second display area is decreased.

For example, in the first mode, the first display area corresponds to a refresh rate of 60 HZ, the second display area corresponds to a refresh rate of 3 HZ, and F11/F12=2. In the second mode, the first display area corresponds to a refresh rate of 10 HZ, the second display area corresponds to a refresh rate of 1 HZ, and F21/F22=10. In the first mode, the first and second display areas corresponds to a high refresh rate. In response to the switch from the first mode to the second mode, the ratio of the refresh rate corresponding to the first display area to the refresh rate corresponding to the second display area is increased.

Figure 8:
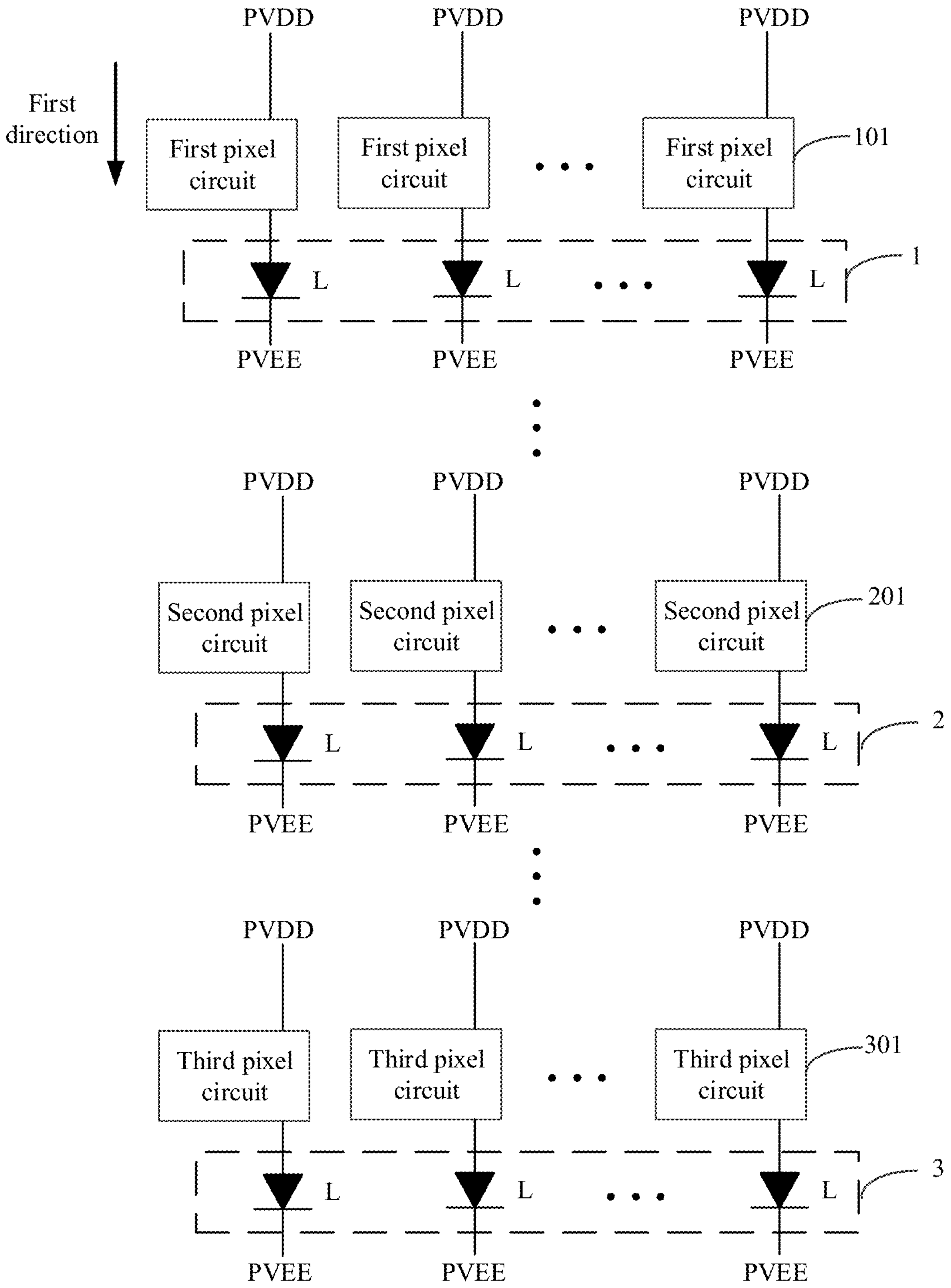
FIG. 8 is a schematic diagram illustrating the display panel according to another embodiment of the present disclosure.

In some embodiments, as shown in FIG. 8, the display panel further includes a third display area 3. The pixel circuit further includes a third pixel circuit 301. The third pixel circuit 301 supplies the current for driving a light emitting element L in the third display area 3.

In the first mode, the third display area corresponds to a refresh rate of F13. In the second mode, the third display area corresponds to a refresh rate of F23. There is at least one of the relationships of $|F21-F11| \neq |F23-F13|$ and $|F22-F12| \neq |F23-F13|$. In some embodiments of the present disclosure, the refresh rate corresponding to the third display area changes differently than at least one of the first display area and the second display area. Therefore, the refresh rates corresponding to the three display areas can be modified separately, for the three display areas to perform their respective functions better.

In some embodiments, as shown in FIG. 8, the first display area 1, the second display area 2 and the third display area 3 are arranged sequentially along the first direction, in which columns are arranged. There is at least one of the relationships of $(F11-F12) \times (F12-F13) > 0$ and $(F21-F22) \times (F22-F23) > 0$. The refresh rates corresponding to the three display areas arranged in the first direction are in ascending or descending order in at least one of the first and second modes. The refresh rates corresponding to the three display areas change sequentially, to solve a problem of flickering due to a large difference in refresh rate between display areas.

For example, in the case of $F11-F12>0$ and $F12-F13>0$, the refresh rates corresponding to the three display areas are in descending order in the first mode. In one embodiment, in the case of $F11-F12<0$ and $F12-F13<0$, the refresh rates corresponding to the three display areas are in ascending order in the first mode.

In the case of $F21-F22>0$ and $F22-F23>0$, the refresh rates corresponding to the three display areas are in descending order in the second mode. In one embodiment, in the case of $F21-F22<0$ and $F22-F23<0$, the refresh rates corresponding to the three display areas are in ascending order in the second mode.

In some embodiments, there is at least one of the relationships of $|F11-F13| \neq |F21-F23|$ and $|F12-F13| \neq |F22-F23|$. $|F11-F13|$ is a difference between the refresh rate corresponding to the first display area and the refresh rate corresponding to the third first display area in the first mode. $|F21-F23|$ is a difference between the refresh rate corresponding to the first display area and the refresh rate corresponding to the third first display area in the second mode. $|F12-F13|$ is a difference between the refresh rate corresponding to the second first display area and the refresh rate corresponding to the third first display area in the first mode. $|F22-F23|$ is a difference between the refresh rate corresponding to the second first display area and the refresh rate corresponding to the third first display area in the second mode.

At least one of the difference in refresh rate between the first display area and the third display area and the difference in refresh rate between the second display area and the third display area in one mode is different than that in the other mode. The difference in refresh rate between the first and third display areas and the difference in refresh rate between the second and third display areas in one mode can be modified separately than the other mode, and the display areas can perform their respective functions better.

In some embodiment, there is at least one of the relationships of $F11/F12 \leq F12/F13$ and $F21/F22 \leq F22/F23$.

For example, in the case of $F11/F12 \leq F12/F13$, the refresh rates corresponding to the three display areas arranged sequentially along the first direction are in descending order in the first mode. For example, in the case of $F21/F22 \leq F22/F23$, the refresh rates corresponding to the three display areas arranged sequentially along the first direction are in descending order in the second mode.

A low refresh rate in a mode indicates a large ratio of the refresh rate corresponding to one display area to the refresh rate corresponding to another display area in this mode. For example, in one of the first mode and the second mode, the first display area corresponds to a refresh rate of 120 HZ, the second display area corresponds to a refresh rate of 60 HZ, and the third display area corresponds to a refresh rate of 10 HZ, and there are ratios of $F11/F12=120/60=2$ and $F12/F13=60/10=6$.

In some embodiments, as shown in FIG. 8, the first display area 1, the second display area 2 and the third display area 3 are sequentially arranged along the first direction, in which columns are arranged. There is at least one of the relationships of $(F12-F11) \times (F12-F13) > 0$ and $(F22-F21) \times (F22-F23) > 0$.

In the first direction, the second display area 2 is located between the first display area 1 and the third display area 3. In the first mode, the second display area corresponds to a refresh rate greater or less than the first display area and the third display area. In the second mode, the second display area corresponds to a refresh rate greater or less than the first display area and the third display area.

Figure 9:
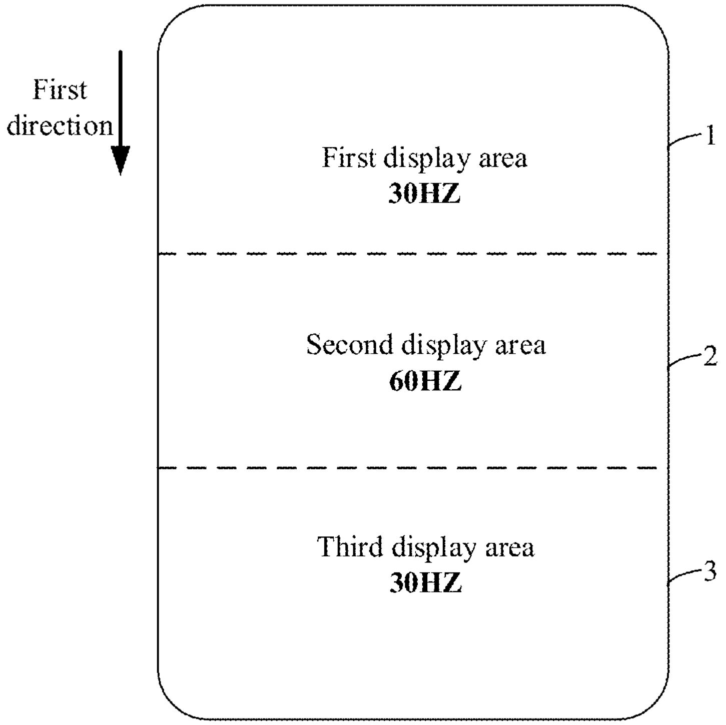
FIGS. 9 to 21 each are a schematic diagram illustrating frequencies at which data displayed in display areas in the display panel are refreshed according to an embodiment of the present disclosure.
Figure 10:
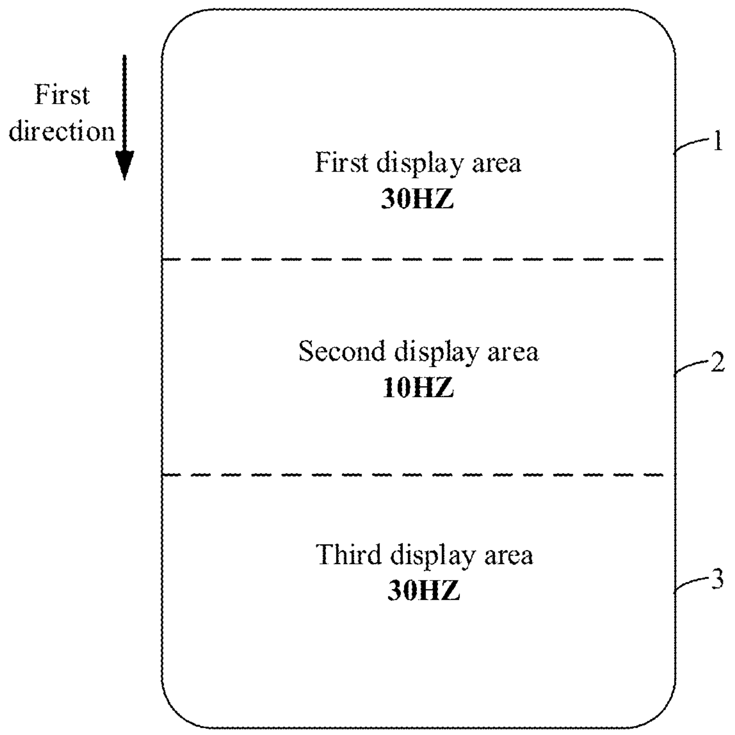

For example, as shown in FIG. 9, in at least one of the first mode and the second mode, the first display area 1 corresponds to a refresh rate of 30 HZ, the second display area 2 corresponds to a refresh rate of 60 HZ, and the third display area 3 corresponds to a refresh rate of 30 HZ. In one embodiment, as shown in FIG. 10, in at least one of the first mode and the second mode, the first display area 1 corresponds to a refresh rate of 30 HZ, the second display area 2 corresponds to a refresh rate of 10 HZ, and the third display area 3 corresponds to a refresh rate of 30 HZ.

Figure 11:
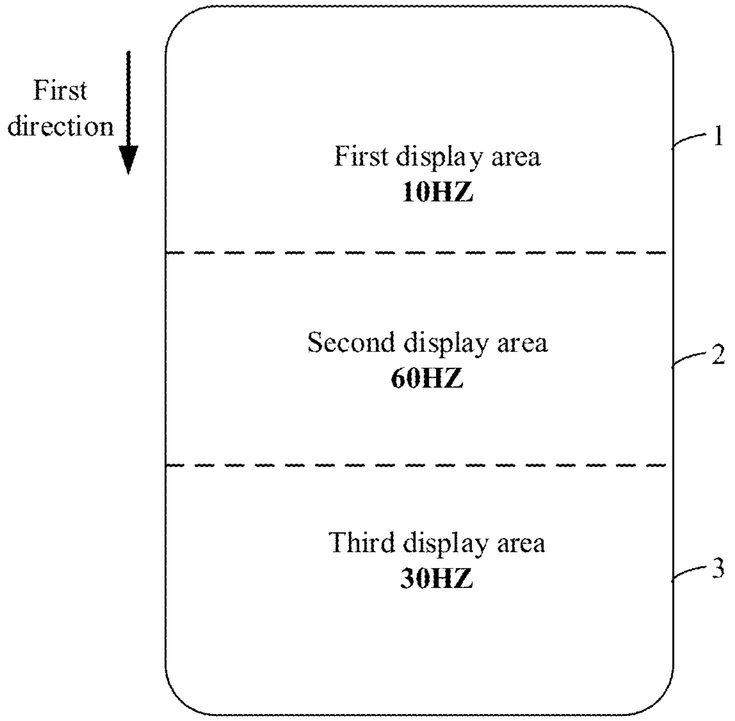
Figure 12:
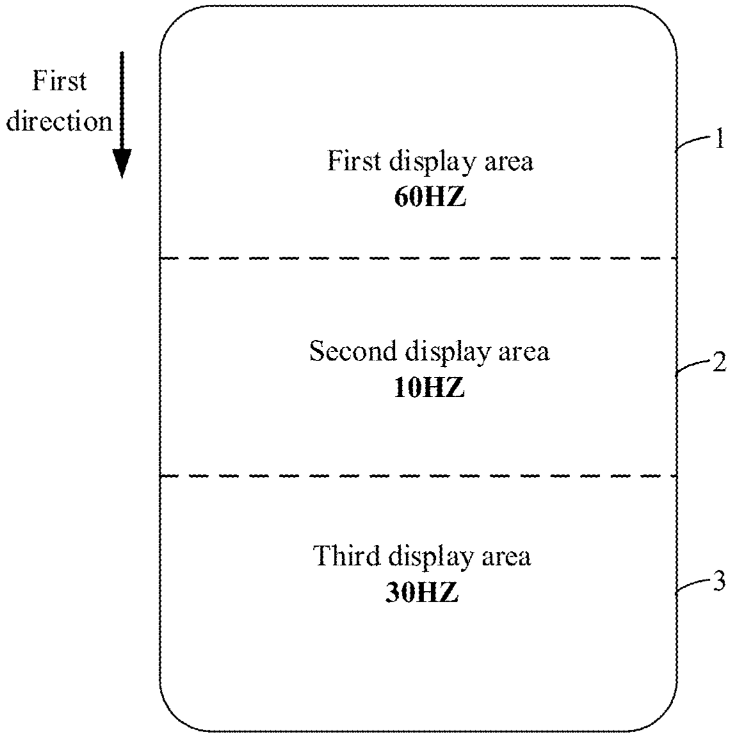

For example, as shown in FIG. 11, in at least one of the first mode and the second mode, the first display area 1 corresponds to a refresh rate of 10 HZ, the second display area 2 corresponds to a refresh rate of 60 HZ, and the third display area 3 corresponds to a refresh rate of 30 HZ. In one embodiment, as shown in FIG. 12, in at least one of the first mode and the second mode, the first display area 1 corresponds to a refresh rate of 60 HZ, the second display area 2 corresponds to a refresh rate of 10 HZ, and the third display area 3 corresponds to a refresh rate of 30 HZ.

In some embodiments, there is at least one of the relationships of |F12−F11|=|F12−F13| and |F22−F21|=|F22−F23|. The first display area corresponds to the same refresh rate as the third display area in at least one of the first mode and the second mode.

That is, the refresh rate corresponding to the first display area and the refresh rate corresponding to the third display area are symmetrically set with respect to the second display area.

For example, as shown in FIG. 9, the second display area 2 corresponds to a relatively high refresh rate, and the first display area 1 corresponds to the same refresh rate as the third display area 3. In one embodiment, as shown in FIG. 10, the second display area 2 corresponds to a relatively low refresh rate, and the first display area 1 corresponds to the same refresh rate as the third display area 3.

In some embodiments, there is at least one of the relationships of |F12−F11|≠|F12−F13| and |F22−F21|≠|F22−F23|. The first display area corresponds to a different refresh rate than the third display area in at least one of the first mode and the second mode. That is, the refresh rate corresponding to the first display area and the refresh rate corresponding to the third display area are asymmetrically set with respect to the second display area.

For example, as shown in FIG. 11, the second display area 2 corresponds to a relatively high refresh rate, and the first display area 1 corresponds to a different refresh rate than the third display area 3. In one embodiment, as shown in FIG. 10, the second display area 2 corresponds to a relatively low refresh rate, and the first display area 1 corresponds to a different refresh rate than the third display area 3.

In some embodiments, there is at least one of the relationships of |F12−F11|>|F12−F13| and |F22−F21|>|F22−F23|. |F12−F11| is a difference between the refresh rate corresponding to the second first display area and the refresh rate corresponding to the first display area in the first mode. |F12−F13| is a difference between the refresh rate corresponding to the second first display area and the refresh rate corresponding to the third first display area in the first mode. |F22−F21| is a difference between the refresh rate corresponding to the second first display area and the refresh rate corresponding to the first display area in the second mode. |F22−F23| is a difference between the refresh rate corresponding to the second first display area and the refresh rate corresponding to the third first display area in the second mode.

In at least one of the first and second modes, the refresh rate corresponding to the second first display area is significantly different than the refresh rate corresponding to the first display area, and the refresh rate corresponding to the second display area is slightly different than the refresh rate corresponding to the third display area.

Figure 24:
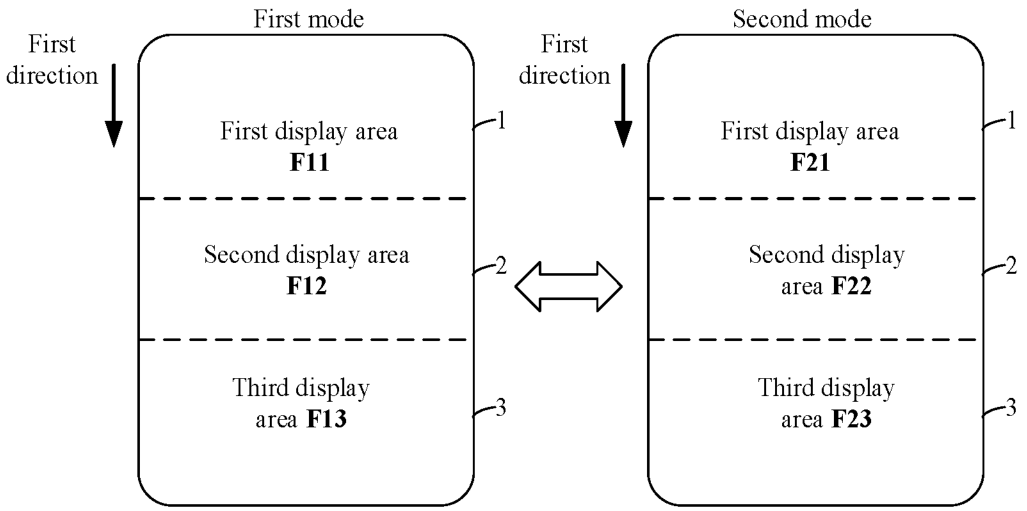

In one embodiment, there is the relationship of |F12−F11|>|F12−F13| and |F22−F21|<|F22−F23|, as shown in FIG. 24. In one embodiment, there is the relationship of |F12−F11|<|F12−F13| and |F22−F21|>|F22−F23|, as shown in FIG. 24.

The difference in refresh rate between the second display area and the first display area is greater than the difference in refresh rate between the second display area and the third display area in the first mode, and is less than the difference between the second display area and the third display area in the second mode. In one embodiment, the difference in refresh rate between the second display area and the first display area is less than the difference in refresh rate between the second display area and the third display area in the first mode, and is greater than the difference between the second display area and the third display area in the second mode.

In some embodiments, as shown in FIG. 8, the first display area 1, the second display area 2 and the third display area 3 are sequentially arranged along a first direction, in which columns are arranged. There is the relationship of (F12−F11)×(F12−F13)>0 and (F21−F22)×(F22−F23)>0. In one embodiment, there is the relationship of (F11−F12)×(F12−F13)>0 and (F22−F21)×(F22−F23)>0.

In a case of (F12−F11)×(F12−F13)>0 and (F21−F22)×(F22−F23)>0, the second display area corresponds to a refresh rate greater or less than the first display area and the third display area in the first mode, and the refresh rates corresponding to the three display areas are in ascending or descending order in the second mode.

In a case of (F11−F12)×(F12−F13)>0 and (F22−F21)×(F22−F23)>0, the refresh rates corresponding to the three display areas are in ascending or descending order in the first mode, and the second display area corresponds to a refresh rate greater or less than the first display area and the third display area in the second mode.

Figure 13:
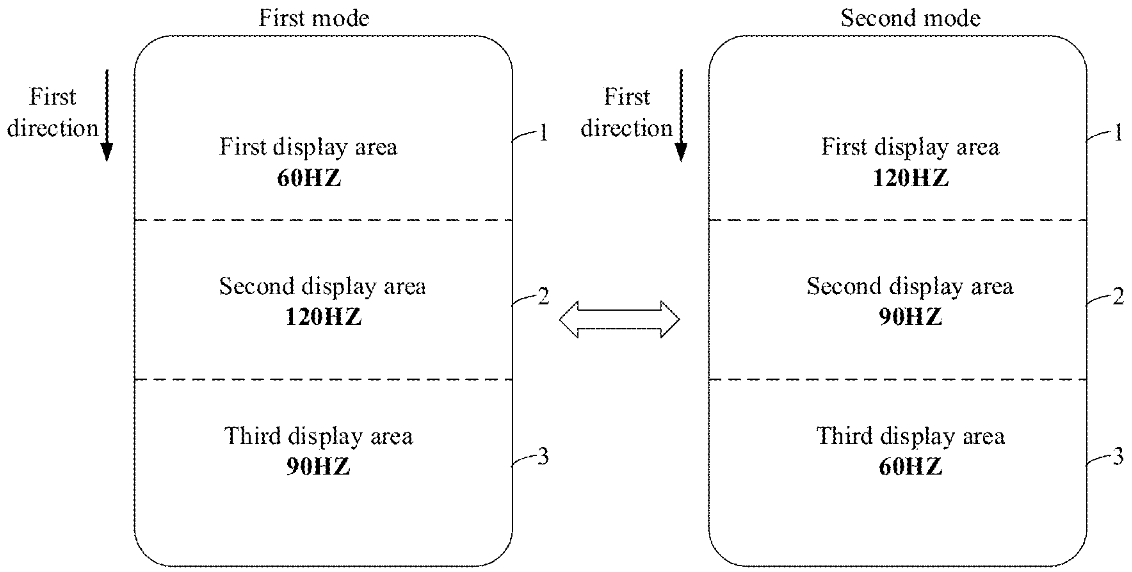

For example, as shown in FIG. 13, the first display area 1 corresponds to a refresh rate of 60 HZ, the second display area 2 corresponds to a refresh rate of 120 HZ, and the third display area 3 corresponds to a refresh rate of 90 HZ in the first mode. In the second mode, the first display area 1 corresponds to a refresh rate of 120 HZ, the second display area 2 corresponds to a refresh rate of 90 HZ, and the third display area 3 corresponds to a refresh rate of 60 HZ.

Figure 14:
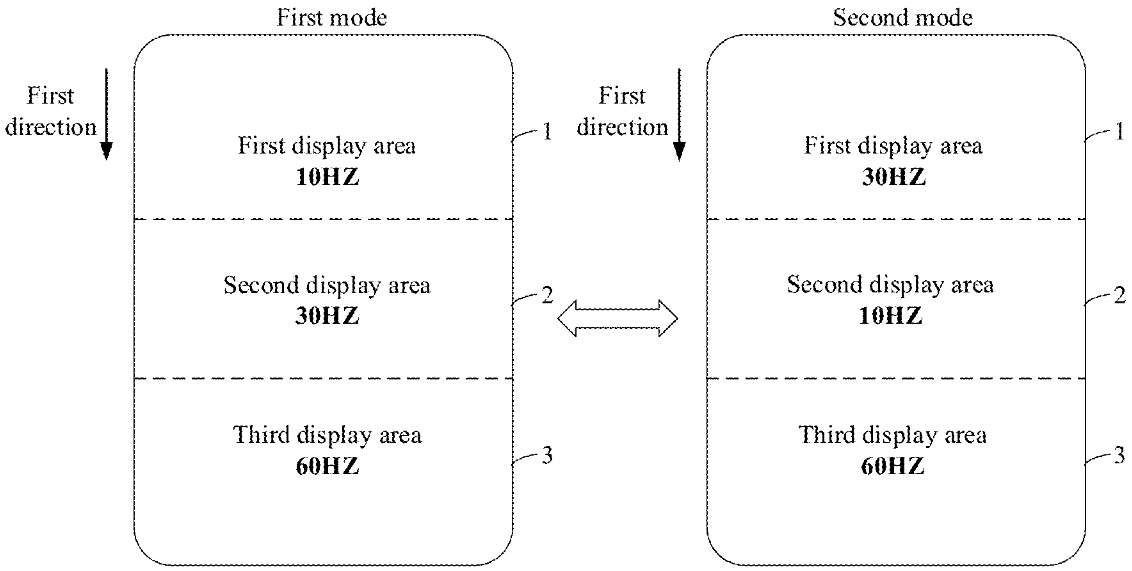

For example, as shown in FIG. 14, the first display area 1 corresponds to a refresh rate of 10 HZ, the second display area 2 corresponds to a refresh rate of 30 HZ, and the third display area 3 corresponds to a refresh rate of 60 HZ in the first mode. In the second mode, the first display area 1 corresponds to a refresh rate of 30 HZ, the second display area 2 corresponds to a refresh rate of 10 HZ, and the third display area 3 corresponds to a refresh rate of 60 HZ.

It should be noted that two display areas and/or three display areas are described in the above embodiments for illustration. In practice, the display panel may include more than three display areas.

Figure 15:
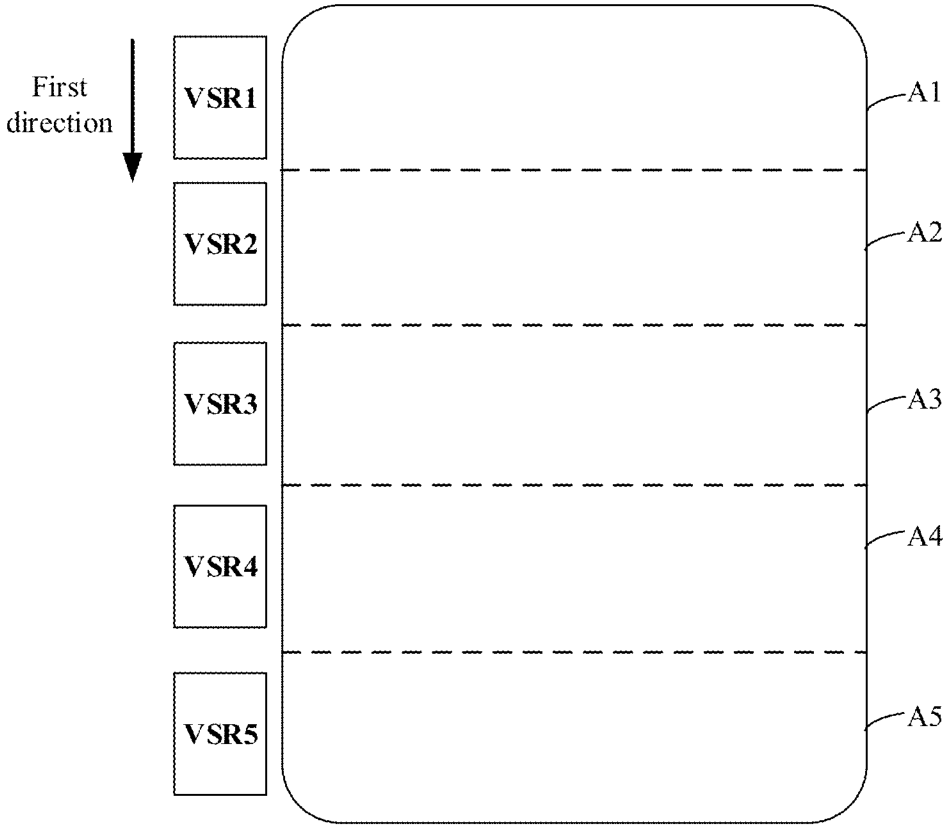

For example, as shown in FIG. 15, the display panel includes five display areas arranged sequentially in the first direction, namely, display areas A1 to A5 among which the first display area, the second display area and the third display area are included.

In some embodiments, the display panel includes shift register circuits, among which a shift register circuit VSR1 is configured to regulate a refresh rate corresponding to the area A1, a shift register circuit VSR2 is configured to regulate a refresh rate corresponding to the area A2, a shift register circuit VSR3 is configured to regulate a refresh rate corresponding to the area A3, a shift register circuit VSR4 is configured to regulate a refresh rate corresponding to the area A4, and a shift register circuit VSR5 is configured to regulate a refresh rate corresponding to the area A5.

Figure 16:
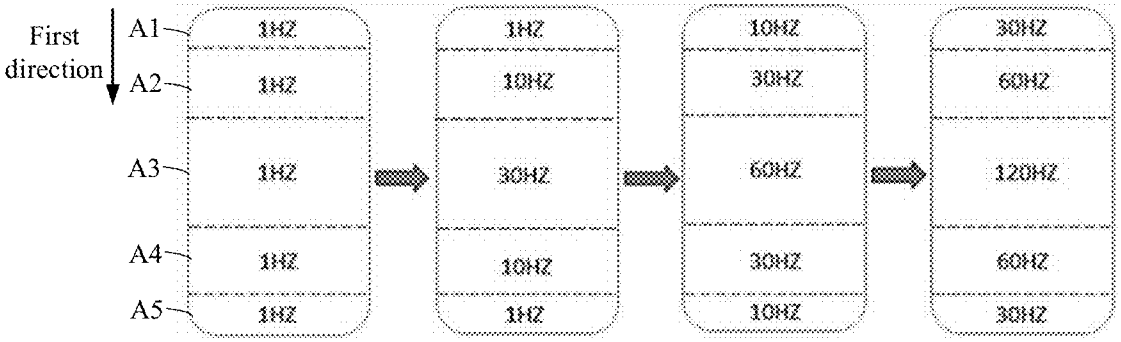
Figure 17:
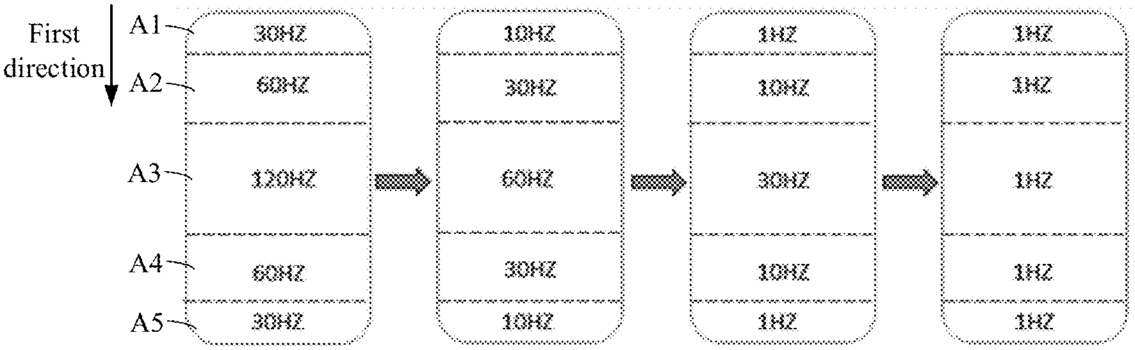

For example, as shown in FIG. 16 or FIG. 17, only the area A3 displays an image, and other areas are black. In this case, the area A3 corresponds to a high refresh rate, and areas from A3 to both ends refresh with respective frequencies in descending order. That is, a refresh rate corresponding to an area displaying an image is higher than a refresh rate corresponding to another area not displaying an image. The problem of flickering due to a large difference in refresh rate between display areas can be solved and power consumption in the area refreshing with a relatively low refresh rate can be reduced.

Figure 18:
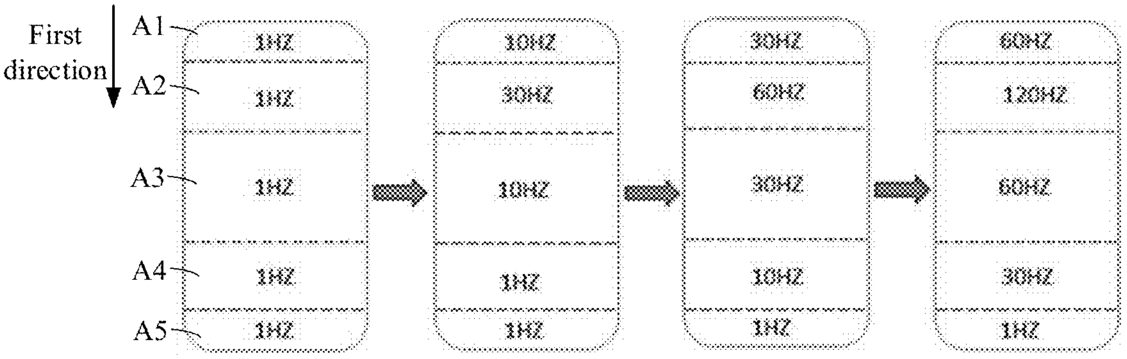
Figure 19:
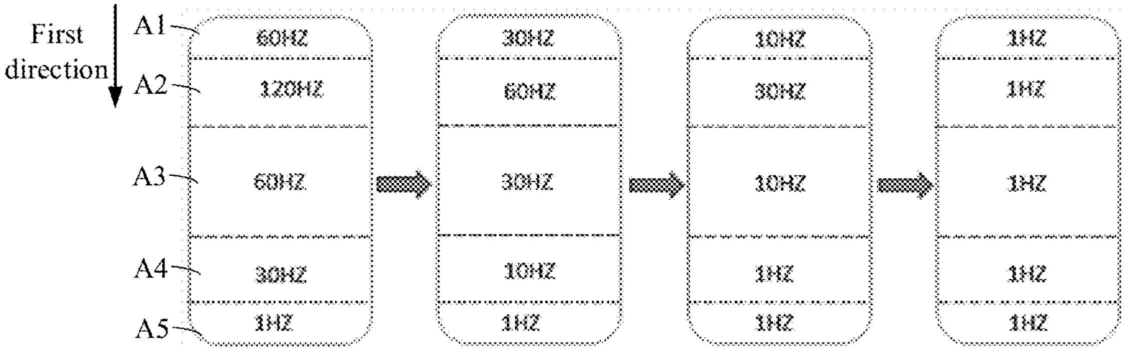

In some embodiments, as shown in FIG. 18 or FIG. 19, only the area A2 displays an image, and other areas are black. In this case, the area A2 corresponds to a high refresh rate, and areas from A2 to both ends refresh with respective frequencies in descending order. That is, a refresh rate corresponding to an area displaying an image is higher than a refresh rate corresponding to another area not displaying an image. The problem of flickering due to a large difference in refresh rate between display areas can be solved and power consumption in the area refreshing with a relatively low refresh rate can be reduced.

Figure 20:
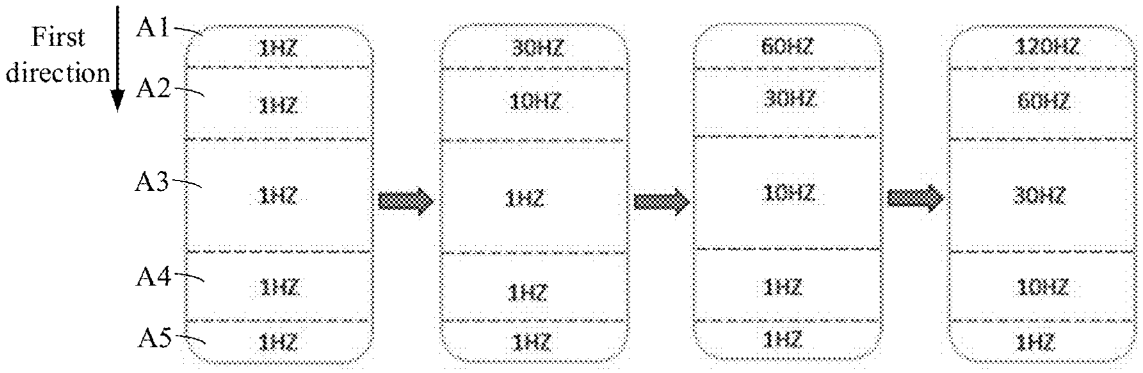
Figure 21:
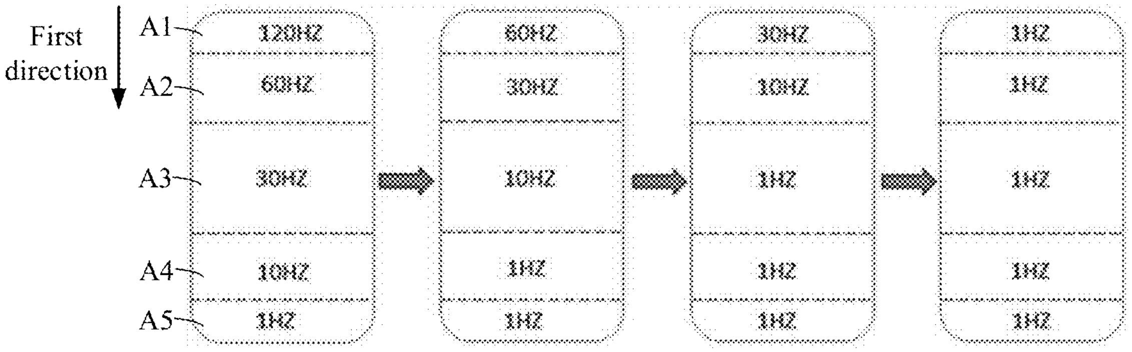

In some embodiments, as shown in FIG. 20 or FIG. 21, only the area A1 displays an image, and other areas are black. In this case, the area A1 corresponds to a high refresh rate, and the areas from A1 to A5 refresh with respective frequencies in descending order. That is, a refresh rate corresponding to an area displaying an image is higher than a refresh rate corresponding to another area not displaying an image. The problem of flickering due to a large difference in refresh rate between display areas can be solved and power consumption in the area refreshing with a relatively low refresh rate can be reduced.

It should be noted that refresh rates in the present disclosure may be set to the numerical values as described in the examples and the drawings, and are not limited thereto.

It should be noted that transistor in the embodiments of the present disclosure is an N-type transistor or a P-type transistor. The N-type transistor switches on by a high level, and switches off by a low level. That is, when the gate potential of the N-type transistor is at the high level, a conducting path is established between the first electrode and the second electrode of the N-type transistor. When the gate potential of the N-type transistor is at the low level, the first electrode is cut off from the second electrode of the N-type transistor. The P-type transistor witches on by a low level, and witches off by a high level. That is, when the gate potential of the P-type transistor is at the low level, a conducting path is established between the first electrode and the second electrode of the P-type transistor. When the gate potential of the P-type transistor is at the high level, the first electrode is cut off from the second electrode of the P-type transistor. In practice, the gate electrode of each of the transistors serves as its control electrode. Further, the first electrode serves as the source electrode and the second electrode serves as the drain electrode, or the first electrode serves as the drain electrode and the second electrode serves as the source electrode, depending on a signal received by the gate electrode.

Figure 22:
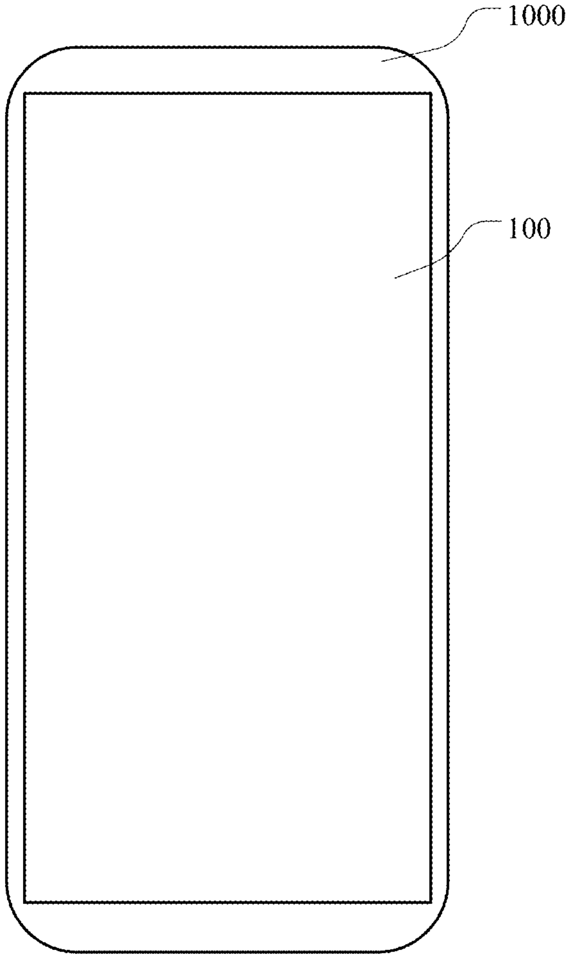
FIG. 22 is a schematic diagram illustrating a display device according to an embodiment of the present disclosure, and FIGS. 23-26 each are a schematic diagram illustrating refresh rates of a display panel in the first and second modes according to an embodiment of the present disclosure.

Based on some embodiment, a display device is also provided according to the present disclosure. The display device includes the display panel as described above. FIG. 22 is a schematic structural diagram illustrating the display device according to an embodiment of the present disclosure. The display device 1000 as shown in FIG. 22 includes the display panel 100 according to any one of the above embodiments. The display device 1000 as shown in FIG. 22 is described by a mobile phone. It should be understood that the display device according to embodiments of the present disclosure may be a wearable product, a computer, a television, a vehicle-mounted display device or the like, which are not limited herein. The display device according to the embodiments of the present disclosure has the same beneficial effects as the display panel according to the embodiments of the present disclosure. For further details, reference can be made to the description of the display panel in the above embodiments. Therefore, the display device is not detailed herein.

The display panel and the display device according to the embodiments of the present disclosure are described above. The display panel includes the first display area 1, the second display area 2 and the pixel circuit.

The pixel circuit includes the first pixel circuit 101 and the second pixel circuit 201. The first pixel circuit 101 supplies a current for driving the light emitting element L in the first display area 1. The second pixel circuit 201 supplies a current for driving the light emitting element L in the second display area 2.

The pixel circuit is configured to operate in a first mode and a second mode.

In the first mode, the first display area 1 corresponds to a refresh rate of F11, and the second display area 2 corresponds to a refresh rate of F12. In the second mode, the first display area 1 corresponds to a refresh rate of F21, and the second display area 2 corresponds to a refresh rate of F22. There is a relationship of $|F21-F11| \neq |F22-F12|$.

The refresh rat refers to a frequency with which the data signal Vdata is written to the gate electrode of the driving transistor T2 in the pixel circuit. A high refresh rate indicates that a potential at the gate electrode of the driving transistor T2 changes frequently.

Conversely, a low refresh rate indicates that the potential at the gate electrode of the driving transistor T2 changes infrequently.

The display panel includes the first display area and the second display area that are different. In the same mode, the first display area corresponds to a refresh rate different than the second display area. The first display area in one mode corresponds to a refresh rate different from the second display area in the other mode. In the embodiments of the present disclosure, there is the relationship of $|F21-F11| \neq |F22-F12|$, that is, the refresh rate corresponding to the first display area changes differently than the second display area, and the refresh rate corresponding to the first display area can be modified separately from the refresh rate corresponding to the second display area in each mode. Therefore, the display areas can perform their respective functions better.

The embodiments of the present disclosure described above neither describe all details, and thus the present disclosure is not limited these embodiments. Many modifications and variations may be made in light of the above description. These embodiments are described herein to better explain the principles and practical applications of the present disclosure. This application is limited only by the claims and their full scope and equivalents.

The invention claimed is:

1. A display panel, comprising:

a first display area;

a second display area;

a third display area; and a pixel circuit, wherein the pixel circuit comprises a first pixel circuit and a second pixel circuit, the first pixel circuit is connected to a light emitting element in the first display area, the second pixel circuit is connected to a light emitting element in the second display area, the pixel circuit is configured to operate in a first mode and a second mode, and wherein in the first mode, the first display area corresponds to a refresh rate of F11 and the second display area corresponds to a refresh rate of F12; in the second mode, the first display area corresponds to a refresh rate of F21, and the second display area corresponds to a refresh rate of F22, and wherein $|F21-F11| \neq |F22-F12|$, wherein the third display area corresponds to a refresh rate of F13 in the first mode and corresponds to a refresh rate of F23 in the second mode, and wherein $|F21-F11| \neq |F23-F13|$; and/or $|F22-F12| \neq |F22-F13|$, wherein $F11>F12>F13$, $F11/F12<F12/F13$, $F21>F22>F23$, and $F21/F22 \leq F22/F23$;

wherein $F11>F21$ and $1 \leq F11/F12<F21/F22$; or $(F21-F11) \times (F22-F12)<0$.

2. The display panel according to claim 1, wherein $F11>F21$ and $1 \leq F11/F12<F21/F22$, and $(F21-F11) \times (F22-F12) \geq 0$.

3. The display panel according to claim 2, wherein $F11>F21$ and $1 \leq F11/F12<F21/F22$, and $F12=F22$ and $F11 \neq F21$.

4. The display panel according to claim 2, wherein $F21-F11<0$ and $F22-F12<0$.

5. The display panel according to claim 1, wherein $(F21-F11) \times (F22-F12)<0$, $F21-F11>0$ and $F22-F12<0$; or $F21-F11<0$ and $F22-F12>0$.

6. The display panel according to claim 1, wherein $|F11-F12| \neq |F21-F22|$.

7. The display panel according to claim 6, wherein $F11>F21$ and $|F11-F12|>|F21-F22|$.

8. The display panel according to claim 1, wherein $|F11-F13| \neq |F21-F23|$; and/or $|F12-F13| \neq |F21-F23|$.

9. A display device comprising the display panel according to claim 1.

10. A display panel, comprising:

a first display area;

a second display area;

a third display area; and a pixel circuit, wherein the pixel circuit comprises a first pixel circuit and a second pixel circuit, the first pixel circuit is connected to a light emitting element in the first display area, the second pixel circuit is connected to a light emitting element in the second display area, the pixel circuit is configured to operate in a first mode and a second mode, and wherein in the first mode, the first display area corresponds to a refresh rate of F11 and the second display area corresponds to a refresh rate of F12; in the second mode, the first display area corresponds to a refresh rate of F21, and the second display area corresponds to a refresh rate of F22, and wherein $|F21-F11| \neq |F22-F12|$, wherein the third display area corresponds to a refresh rate of F13 in the first mode and corresponds to a refresh rate of F23 in the second mode, and wherein $|F21-F11| \neq |F23-F13|$; and/or $|F22-F12| \neq |F23-F13|$, wherein the first display area, the second display area and the third display area are arranged sequentially along a first direction; and wherein $F12>F11$, and $F12>F13$; and/or $F22>F21$, and $F23>F13$, wherein $|F12-F11|>|F12-F13|$ and $|F22-F21|<|F22-F23|$; or $|F12-F11|<|F12-F13|$, and $|F22-F21|>|F22-F23|$.

11. A display device comprising the display panel according to claim 10.

* * * * *